United States Patent

[11] 3,599,998

[72] Inventors: Jozef Kiwalle
Peoria, Ill.;
Frederick M. Lamb, South Bend, Ind.
[21] Appl. No. 842,240
[22] Filed July 16, 1969
[45] Patented Aug. 17, 1971
[73] Assignee Caterpillar Tractor Co.
Peoria, Ill.

[54] SPRING-ACTUATED CHUCK ASSEMBLY
10 Claims, 5 Drawing Figs.
[52] U.S. Cl................................................. 279/51,
29/470.3, 228/2, 279/4
[51] Int. Cl.................................................. B23b 31/20
[50] Field of Search.......................................... 279/51, 1
A, 1 SG, 102, 103, 4, 50, 96; 228/2; 29/470.3

[56] References Cited
UNITED STATES PATENTS
3,143,356 8/1964 Pray.......................... 279/51 X 3,171,664 3/1965 Benjamin et al.............. 279/50
3,234,851 2/1966 Braun et al................... 279/51 X
3,512,792 5/1970 Farley et al.................. 279/51

Primary Examiner—Andrew R. Juhasz
Assistant Examiner—James F. Coan
Attorney—Fryer, Tjensvold, Feix, Phillips & Lempio ABSTRACT: A chuck assembly including a first ring element secured to a base structure such as a spindle with a second ring element being movable relative to the first element. A chucking element or collet sleeve is associated with one element and arranged for interaction with the other element so that the chucking member is actuated for engaging a workpiece by spring means acting between the two elements. The chucking member is preferably designed with a backup plate permitting axial forces applied to the chucking member through the workpiece to cooperate with the spring for further tightening the chucking member upon the workpiece.

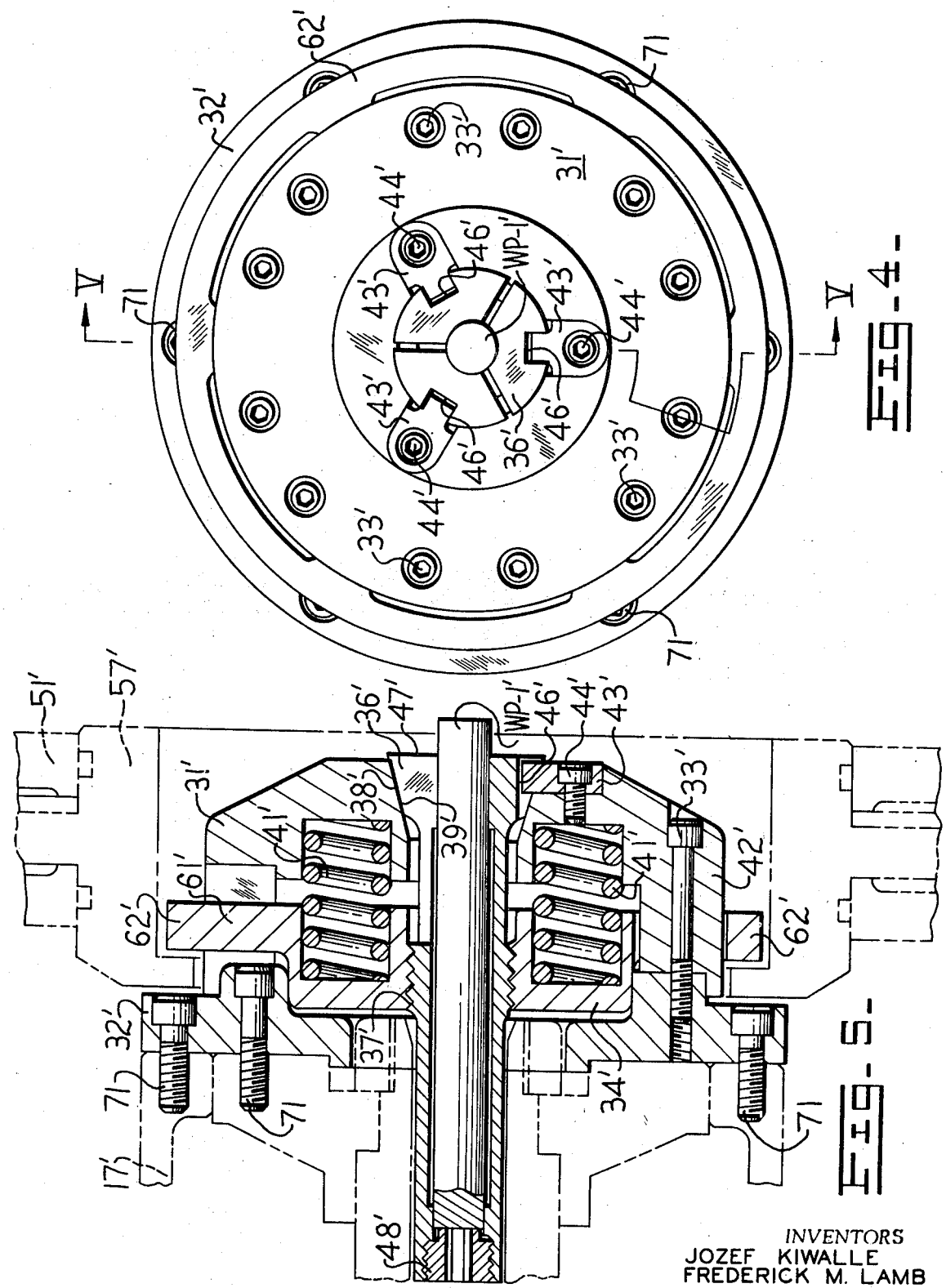

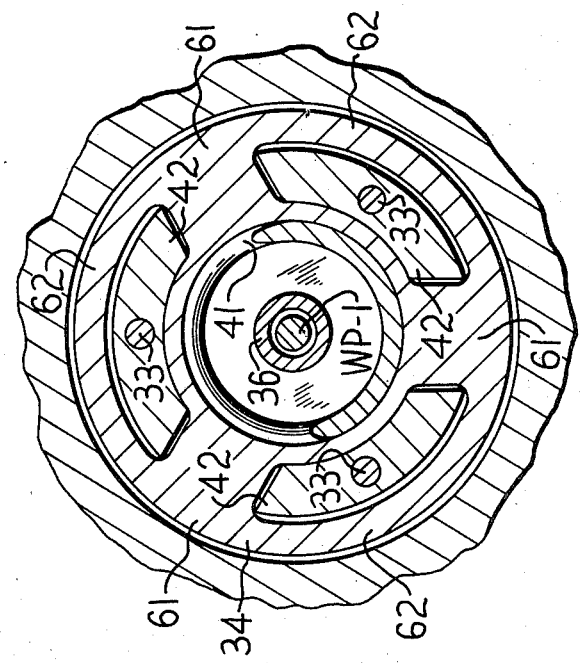
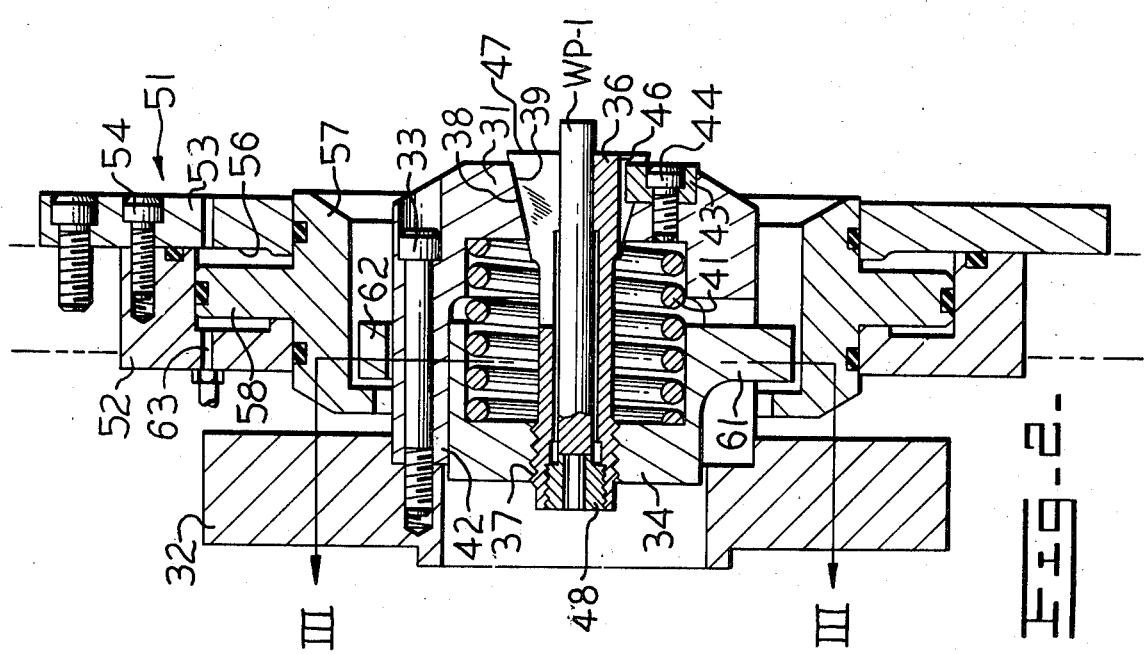

SPRING-ACTUATED CHUCK ASSEMBLY

The present invention relates to chuck assemblies and more particularly to a chuck assembly which is actuated for gripping a workpiece by one or more springs contained within the chuck assembly. An exemplary embodiment of the chuck assembly is described below in combination with a friction welding machine wherein operating advantages of the chuck assembly may be used to particular advantage. However, it will be apparent from the following description that a chuck assembly constructed according to the present invention may be used in numerous other applications, for example in machine tools.

In the prior art, chuck assemblies of the type contemplated by the present invention are normally actuated for gripping a workpiece by external motor means such as hydraulic cylinders which are coupled to various portions of the chuck assembly, for example, by a drawbar. Since chuck assemblies employed in applications such as friction welding machines commonly require rotational operation of the chuck at very high speeds, it is desirable to maintain the chuck within as compact a configuration possible. For the same reason, it is generally desirable to eliminate or simplify any interconnection between the chuck assembly and external components such as a motor for actuating the chuck.

The present invention provides a novel chuck assembly which fulfills these requirements through the use of one or more self-contained springs for actuating the chuck into gripping relation with a workpiece.

Accordingly, it is an object of the present invention to provide a chuck assembly which is at least initially actuated into engaging relation with a workpiece by one or more springs contained within the chuck assembly.

It is a further object to provide such a chuck assembly wherein axial thrust force applied upon the chuck assembly from the workpiece is employed in association with the spring to more securely engage the chuck assembly with the workpiece.

Additional objects and advantages of the present invention are made apparent by the following description having reference to the accompanying drawings.

In the drawings:

FIG. 2 is an axially sectioned view of one embodiment of a chuck assembly constructed according to the present invention;

FIG. 3 is a view taken along section lines III-III of FIG. 2;

FIG. 4 is an end view of another embodiment of the present chuck assembly; and

FIG. 5 is a view taken along section lines V-V of FIG. 4.

Figure 1:
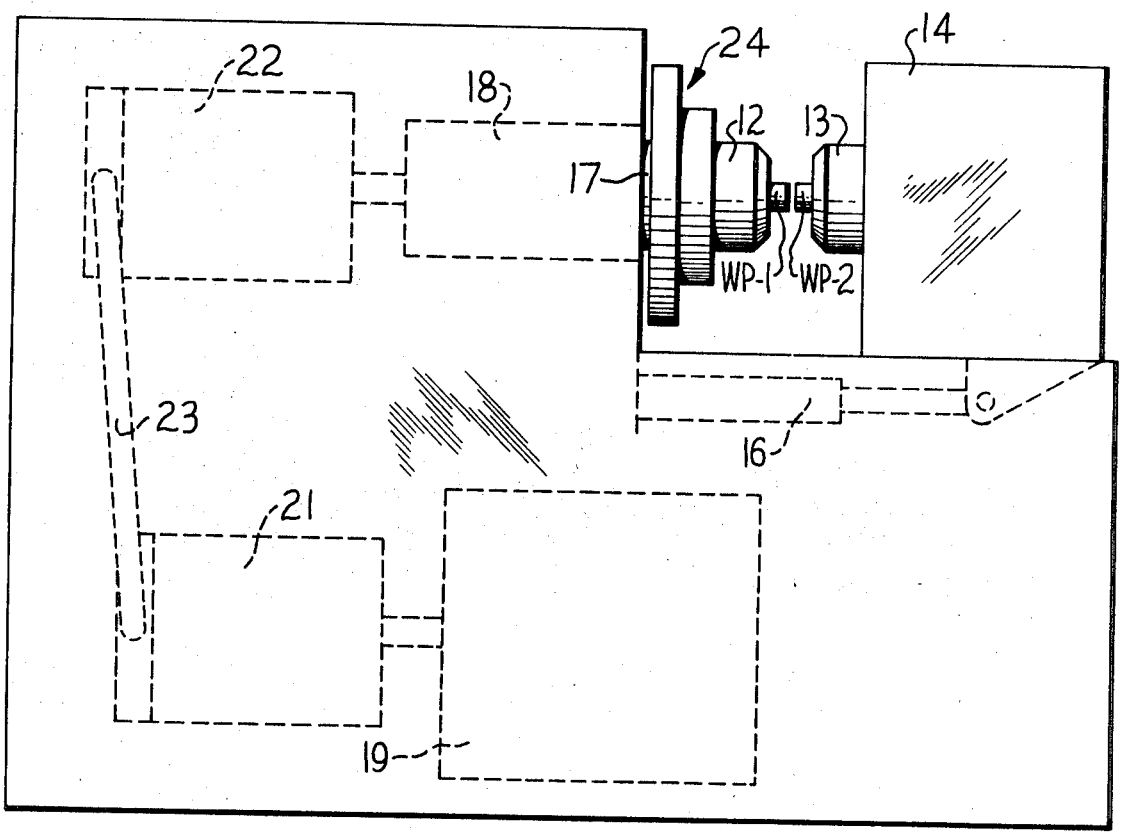
FIG. 1 is a side view in elevation of a friction welding machine with which the present chuck assembly may be employed.

A friction welding machine is illustrated in FIG. 1 as an exemplary setting for the chuck assembly of the present invention. The machine includes a frame 11 with two workpieces WP-1 and WP-2 mounted respectively within chuck assembles 12 and 13. The chuck 13 is mounted upon a tailstock fixture 14 and is secured against rotation. The tailstock fixture is mounted for axial movement on the machine frame under the control of a load cylinder 16. A pressure control circuit (not shown) regulates the flow of fluid under pressure to the load cylinder and thus determines the force with which the parts WP-1 and WP-2 are axially engaged.

The chuck 12 is mounted for rotation with a spindle 17 which is supported within a bearing assembly 18. An electric motor 19 rotates the spindle 17 and chuck assembly 12 through a hydrostatic transmission including a hydraulic pump 21, a hydraulic motor 22 and a manifold 23 arranged between the pump and the motor. One or more inertia weights 24 are mounted for rotation with the spindle to permit operation of the welding machine in accordance with generally conventional inertia welding techniques.

The present invention is particularly concerned with construction of one of the chuck assemblies, for example, the spindle chuck indicated at 12 and the provision of spring means for at least initially actuating the chuck into gripping engagement with the workpiece WP-1.

Reference is now made to FIG. 2 which illustrates one embodiment of a chuck assembly constructed according to the present invention. The chuck assembly includes a first ring element or plate 31 which is secured to a base structure such as the spindle 17 of FIG. 1 by means of an adapter element 32 to which the first chuck element is secured, for example, by capscrews, one of which is indicated at 33. A second chuck element or plate 34 is supported in floating relation relative to the first element 31. A chucking member such as the collet sleeve indicated at 36 is secured to one of the chuck elements, for example, the element 34 to which it is threaded as at 37. The collet sleeve 36 is associated with the other chuck element 31 by means of mating tapered surfaces indicated at 38 and 39 on the sleeve 36 and element 31 respectively. With this arrangement, the split collet sleeve 36 is normally actuated into a slightly collapsed condition for engagement of the workpiece WP-1 by interaction of spring means 41 between the two chuck elements 31 and 34.

To describe the chuck assembly in greater detail, having reference also to FIG. 3, the second chuck element 34 is arranged between the first element 31 and the adapter plate 32 while being supported for axial movement relative to the first element 31. The first element 31 includes axially extending projections 42 which are secured to the adapter plate 32 by means of the capscrews 33. The collet sleeve 36 is secured for rotation with the first chuck element 31 by a key 43 secured to the element 31 by a capscrew 44 and penetrating a slot 46 formed in an adjacent portion of the collet sleeve 36. Since the collet sleeve 36 is secured to the element 31 only by the key 43, it is free for axial movement relative to the element 31.

The spring means 41 is illustrated as a single coil spring coaxially surrounding the collet sleeve 36. Opposite ends of the spring 41 act respectively upon the elements 31 and 34 so that the elements are normally urged axially away from each other causing the collet sleeve to engage the workpiece WP-1.

In many applications, the spring 41 may be sufficient by itself for causing adequate engagement of the collet sleeve upon the workpiece WP-1. However, in applications such as friction welding, very substantial external torque forces are applied to the workpiece WP-1 and must be resisted within the chuck assembly. Accordingly, it is particularly contemplated within the present invention that the spring 41 be employed to cause initial engagement of the workpiece WP-1 with the collet sleeve being further tightened upon the workpiece by axial engagement of the workpieces WP-1 and WP-2 (see FIG. 1) during friction welding operation. Accordingly, the workpiece WP-1 is received at an axially outer end 47 of the collet sleeve 36. A backup plate 48 is secured to the axially inner end of the collet sleeve 36. The workpiece WP-1 then abuts the backup plate 48 when it is properly mounted within the collet sleeve 36. In this manner, axial forces arising from engagement of the workpiece WP-1 and WP-2 cooperate with the spring 41 and urge the chuck elements 31 and 34 further apart. The collet sleeve 36 is thereby collapsed somewhat further and caused to more securely engage the workpiece WP-1 during the friction welding operation.

Motor means for overcoming the spring 41 and permitting the workpiece WP-1 to be either inserted into or removed from the sleeve 36 are indicated at 51. The motor means 51 preferably comprises a hydraulic cylinder formed by two plates 52 and 53 secured together by capscrews, one of which is indicated at 54, to form an annular cavity indicated at 56. An annular member 57 surrounds the first element 31 and includes a piston element 58 extending into the annular cavity 56. The chuck element 34 is formed with radially extending fingers 61 which extend outwardly between the projection 42 to support an annular ring member 62. When the motor 51 is actuated by the introduction of hydraulic fluid under pressure from a suitable pump or other source (not shown) through an inlet passage 63, the chuck element 31 and 34 are shifted axially toward each other against the spring 41 so that the collet sleeve 36 may be slightly expanded to receive the workpiece WP-1.

Another embodiment of the present chuck assembly is illustrated in FIGS. 4 and 5. The chuck assembly of FIGS. 4 and 5 has generally the same components as the embodiment shown in FIGS. 2 and 3. Accordingly, similar primed numerals are employed to label corresponding parts of the embodiment in FIGS. 4 and 5. The major distinction in this embodiment is the use of a plurality of coil springs 41' which are circumferentially arranged about the collet sleeve 36' and interact between the chuck elements 31' and 34'. The single coil spring employed in the embodiment of FIGS. 2 and 3 permits a more compact configuration for the chuck assembly. On the other hand, the plurality of springs in the embodiment of FIGS. 4 and 5 permits more substantial engagement between its collet sleeve 36' and the workpiece WP-1'.

A portion of the spindle 17' is shown by broken lines in FIG. 5 with the adapter plate 32' being secured to the spindle 17' for example, by capscrews such as those indicated at 71. An actuating motor generally similar to that described with reference to FIGS. 2 and 3 is also illustrated partially by broken lines and is indicated at 51'.

What we claim is:

1. A spring-actuated chuck assembly for mounting a workpiece on a base structure, comprising
    a collet sleeve for receiving the workpiece,
    a first chuck element with means for securing it to the base structure, the first chuck element having a tapered surface arranged for interaction with the collet sleeve,
    a second chuck element supported in floating relation with the first element, the collet sleeve being secured for axial movement with the second chuck element, the collet sleeve also being secured for rotation with the first chuck element while being axially movable relative to the first chuck element,
    spring means arranged for interaction between the two elements with the spring means normally urging the two elements apart so that the collet sleeve, upon interaction with the first chuck element, is caused to grip the workpiece,
    a backup plate coupled with the chucking member for axially receiving the workpiece so that axial force applied against the backup plate through the workpiece cooperates with the spring means in urging the two elements apart from each other and further increasing gripping action of the collet sleeve on the workpiece, and
    motor means effectively coupled with the two chuck elements for urging them toward each other against the spring means and permitting the workpiece to be freely inserted into and removed from the collet sleeve.

2. The invention of claim 1 wherein the chuck assembly is arranged on the spindle of a friction welding machine for mounting one of a pair of relatively rotatable workpieces.

3. The invention of claim 1 further comprising an adapter element for securing the first chuck element to the base structure, the second chuck element being supported between the first chuck element and adapter element in coaxial relation with the chucking member.

4. The invention of claim 1 wherein the spring means is a coil spring coaxially arranged about the chucking member for interaction between the two chuck elements.

5. The invention of claim 1 wherein the spring means is a plurality of coil springs circumferentially arranged about the chucking member for interaction between the two chuck elements.

6. The invention of claim 1 wherein the chucking member is keyed for rotation with the first chuck element.

7. A spring-actuated chuck assembly for mounting a workpiece on a base structure, comprising
    a collapsible chucking member for receiving the workpiece,
    a first chuck element with an adapter element for securing the first chuck element to the base structure, the first chuck element having circumferentially arranged projections by which it is secured to the adapter element,
    a second chuck element supported in floating relation between the first chuck element and the adapter element in coaxial relation with the chucking member, the second chuck element having circumferentially arranged fingers extending radially outwardly between the projections of the first chuck element,
    spring means arranged between the two chuck elements with a tendency to urge them axially away from each other, the chucking member being secured for axial movement with the second chuck element and interacting with the first chuck element so that the chucking member is caused to grip the workpiece by means of axial movement of the two elements under influence of the spring means, and
    motor means effectively coupled with the fingers of the second chuck element for urging it toward the first chuck element and against the spring means in order to permit insertion or removal of the workpiece from the chucking member.

8. A spring-actuated chuck assembly for mounting a workpiece on a friction welding machine having means for mounting another workpiece in axially movable relatively rotatable relation with the one workpiece, comprising
    a collapsible collet sleeve for receiving the one workpiece, the collet sleeve having a backup plate secured at an axially inner end thereof for receiving the workpiece,
    a first chuck element and an adapter plate for securing the first chuck element to a spindle of the machine,
    a second chuck element supported in axially floating relation between the first chuck element and adapter plate in coaxial relation with the collet sleeve, the collet sleeve being secured to the second chuck element,
    spring means arranged for interaction between the two chuck elements, the spring means tending to urge the two chuck elements apart and thereby constrict the collet sleeve, and
    motor means operable to urge the two chuck elements toward each other against the spring means, the first chuck element having circumferentially spaced-apart projections for securing it to the adapter plate, the second chuck element having circumferentially arranged fingers extending radially outwardly between the projections for operative association with the motor means.

9. The invention of claim 8 wherein the spring means is a coil spring coaxially arranged about the collet sleeve for axial interaction between the two chuck elements.

10. The invention of claim 8 wherein the spring means comprises a plurality of coil springs circumferentially arranged about the collet sleeve for axial interaction between the two chuck elements.